United States Patent [19]
Paros

[11] 4,448,546
[45] May 15, 1984

[54] DIGITAL TEMPERATURE SENSOR

[75] Inventor: Jerome M. Paros, Redmond, Wash.

[73] Assignee: Novex, Inc., Salt Lake City, Utah

[21] Appl. No.: 211,126

[22] Filed: Nov. 28, 1980

[51] Int. Cl.$^3$ .................. G01K 11/22; G01K 7/32
[52] U.S. Cl. ................................ 374/117; 73/855;
73/DIG. 1; 310/361
[58] Field of Search ............ 73/339 A, 778, 16, 579,
73/DIG. 1, 32 A, 702, 703, 704; 310/9.5, 361;
374/117, 118, 188

[56] References Cited

U.S. PATENT DOCUMENTS

| 1,930,905 | 10/1933 | Nicolson | 73/788 X |
| 2,614,163 | 10/1952 | Roper | 331/66 X |
| 2,750,796 | 6/1956 | Knoll et al. | 374/188 X |
| 2,984,111 | 6/1961 | Kritz | 310/329 X |
| 3,093,760 | 6/1963 | Tarasevich | 73/775 |
| 3,192,763 | 7/1965 | Smart | 73/16 |
| 3,239,789 | 3/1966 | Erdley | 73/517 R |
| 3,350,942 | 11/1967 | Peltola | 374/119 |
| 3,386,282 | 6/1968 | Jacobson | 374/188 X |
| 3,470,400 | 9/1969 | Weisbord | 73/579 |
| 3,479,536 | 11/1969 | Norris | 73/862.59 X |
| 3,879,992 | 4/1975 | Bartera | 73/23 X |
| 3,967,490 | 7/1976 | Brady | 73/32 A |
| 4,155,257 | 5/1979 | Wittke | 73/DIG. 1 X |

Primary Examiner—Daniel M. Yasich
Attorney, Agent, or Firm—Seed and Berry

[57] ABSTRACT

A temperature sensor is formed by mounting a force-sensitive resonator on a resilient or non-resilient base structure, preferably in an enclosure such that thermally induced expansions or contractions of the base structure apply a stress to the resonator. The resonant frequency of the resonator is measured to provide an indication of the temperature of the base structure and resonator.

23 Claims, 5 Drawing Figures

DIGITAL TEMPERATURE SENSOR

BACKGROUND OF THE INVENTION

1. Field of the Invention

This invention relates to new and improved means for sensing temperature and, more particularly, to a temperature sensor generating a digital output by applying a thermally induced mechanical stress to a force-sensitive resonator.

2. Description of the Prior Art

Temperature is a basic physical parameter that cannot be measured directly. It can only be measured indirectly by measuring a physical change caused by a temperature change. The main methods for measuring temperature are measuring the change in density of a gas with temperature (gas thermometer), measuring the change in electrical property of an object with temperature (e.g., the platinum resistance thermometer and the thermocouple), and measuring the difference in thermal expansion coefficients of substances (e.g., the liquid thermometer and bimetallic strip thermometer). None of these previous measurement devices are inherently digital.

The only inherently digital measurements available today, as described hereinafter, all suffer from one problem or another. Commercially available digital temperature sensors utilize a quartz resonator having a temperature-induced frequency change occurring because of inherent properties of the quartz.

A number of inherently analog output thermometers may be coupled to analog-to-digital convertors in order to produce digital temperature sensors. Such devices as thermocouples with voltage-to-frequency convertors and oscillator circuits using temperature-sensitive capacitive or resistive elements can yield a digital-type output. In general, these sensors suffer from poor accuracy and stability, excessive complexity, insufficient reliability, and relatively high power consumption.

Direct digital outputs may be obtained by measuring the frequency of a quartz crystal or tuning fork whose output is a function of temperature. These units have a relatively low sensitivity to temperature and are expensive, both to fabricate and instrument.

U.S. Pat. No. 2,456,811, issued to Blackburn, discloses a temperature measuring system in which piezoelectric crystals oscillate at frequencies dependent upon temperature.

U.S. Pat. No. 2,732,748, issued to Grib, describes a temperature compensation technique for tuning forks using bimetallic elements.

U.S. Pat. No. 3,553,602, issued to Brothers et al., discloses a crystal oscillator temperature-sensing system which determines the temperature on one crystal surface with respect to a reference temperature on the other crystal surface by measuring the operating frequency of the oscillator.

U.S. Pat. No. 3,950,987, issued to Slezinger et al., discloses a piezo-optic measuring transducer in which the difference in thermal expansion of the crystals is measured by detection of the crystals' optical properties, not their resonant frequencies.

U.S. Pat. No. 4,039,969, issued to Martin, discloses a quartz thermometer using a single crystal constructed to have two separate oscillation sections. One section oscillates at a standard frequency, whereas the other section oscillates at a frequency dependent upon the temperature. The two frequencies are compared to determine the temperature.

The prior art devices as described in the above patents cannot meet the desired objectives of an inherently digital-type output, high sensitivity, excellent accuracy and stability, low power consumption, small size and weight, fast response time, high reliability, and low cost.

In an unstressed condition, under constant environmental conditions, a load-sensitive resonator has a unique resonant frequency determined by its dimensions and material composition. The resonant frequency of a flexurally vibrating resonator increases under tensile loading and decreases under compressive loading. A number of load-sensitive transducers utilizing this principle have been developed.

Force-sensitive crystals in which loads are applied to the crystals near the nodal points are described in U.S. Pat. No. 2,984,111, issued to Kritz, and U.S. Pat. No. 3,093,760, issued to Tarasevich.

U.S. Pat. No. 3,470,400, issued to Weisbord, describes a single-beam force transducer with an integral mounting system which effectively decouples the beam vibrations from the mounting points through a spring and mass arrangement.

U.S. Pat. No. 3,238,789, issued to Erdley, discloses two tines or bars vibrating 180 degrees out of phase such that the reactive forces and moments cancel.

SUMMARY OF THE INVENTION

It is an object of this invention to provide a temperature sensor with an inherently digital-type output.

It is another object of this invention to provide a temperature sensor with high sensitivity, accuracy, and stability.

It is still another object of this invention to provide a temperature sensor of small size and weight, low power consumption, and rapid response time.

It is still another object of this invention to provide a temperature sensor with high reliability and low cost.

These and other objects of the invention are accomplished through mounting arrangements and systems which apply thermally induced, mechanical stress to load-sensitive resonators. A load-sensitive resonator may be directly mounted to a base with a coefficient of thermal expansion different from that of the resonator. The relative thermal expansions and contractions between the resonator and base produce a strain and resultant stress in the resonator which changes its frequency of vibration. The term "base," as used herein, means any structure to which the resonator is secured, regardless of the material forming the structure. In another embodiment, the thermally produced strain may act through a spring or bellows to stress the resonator. In yet another embodiment, a fluid-filled bellows may use the thermally induced fluid expansions and contractions to stress a force-sensitive resonator.

DETAILED DESCRIPTION OF THE INVENTION

The present invention is equally applicable to load-sensitive resonators of various shapes and configurations; however, for simplicity and clarity, only the application to flexurally vibrating, force-sensitive beam and closed-end tuning fork devices will be described in detail, it being understood that the same or similar principles apply in the general case.

Figure 1:
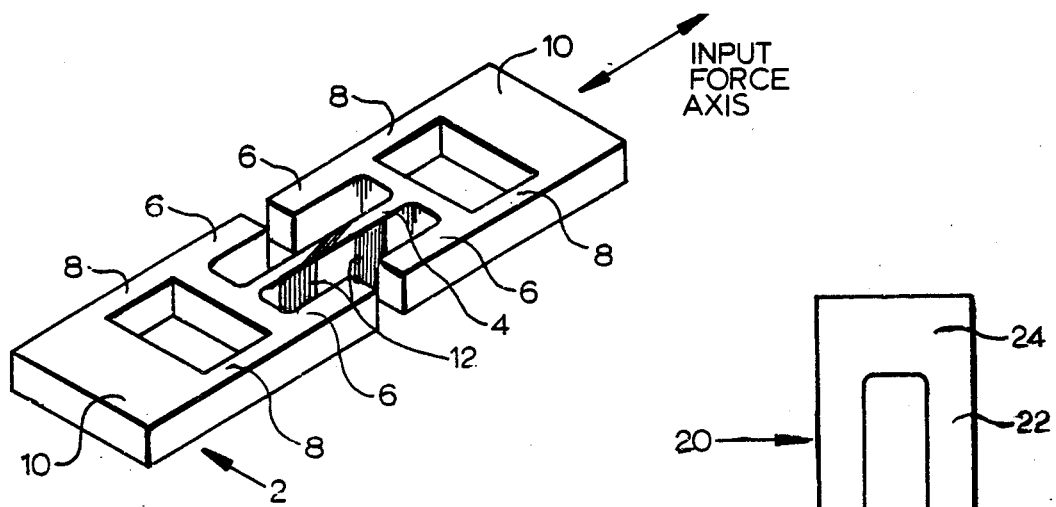
FIG. 1 is an isometric view illustrating a conventional single-beam force transducer with integral mounting isolation.

FIG. 1 illustrates a conventional single-beam force transducer 2 with integral mounting isolation, as disclosed in the aforementioned patent to Weisbord. The transducer 2 consists of a flexurally vibrating center beam 4, two sets of isolator masses 6, and isolator springs 8 extending from each end of the beam 4 to mounting surfaces 10. Axial forces, applied along the longitudinal axis of the transducer 2, stress the vibrating beam 4, thereby changing its resonant frequency in accordance with the magnitude of the applied loads. The isolator masses 6 and isolator springs 8 are designed to decouple the reactive forces and moments generated by the beam 4 from the mounts 10, thus reducing the energy losses. As a result, the transducer 2 has a high "Q" so that its resonant frequency is an accurate representation of the applied forces. The beam 4 may be driven at its resonant frequency using electrodes 12 and oscillator circuitry in any conventional manner, such as is described in U.S. Pat. No. 3,479,536, issued to Norris.

Figure 2:
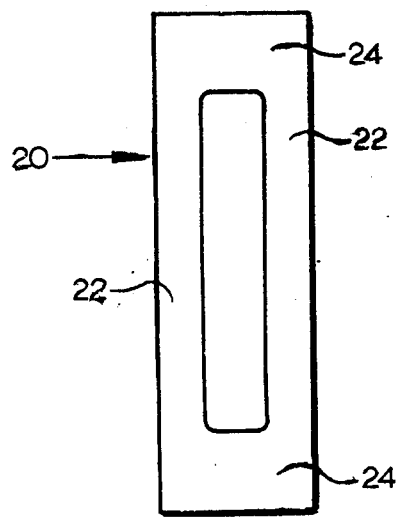
FIG. 2 is a plan view illustrating a conventional closed-end tuning fork sensor.

FIG. 2 is a plan view of a conventional closed-end tuning fork 20 as described in the aforementioned patent to Erdley. This device 20 achieves low energy loss, high "Q" operation by driving a pair of closely matched tines 22, 180 degrees out of phase, thus cancelling the reactive moments and forces which might be transmitted to a mount 24 from which the tines 22 project.

Under constant environmental conditions, the resonant frequency in Hertz, $f_o$, of an unstressed, fixed-ended, flexurally vibrating beam of length L, thickness t, width b, modulus of elasticity E, and density d is given by the formula:

$$f_o = (\text{Constant}) \frac{t}{L^2} \sqrt{\frac{E}{d}} \qquad \text{(Equation 1)}$$

Although the resonant frequency is generally a non-linear function of the applied load F, the first-order load sensitivity $S_F$ may be calculated as:

$$S_F = (\text{Constant}) \frac{L^2 F}{E b t^3} \qquad \text{(Equation 2)}$$

The quantitative relationships between resonant frequency, applied load, and resonator dimensions and composition can be determined from the above formulae. In particular, thermally induced mechanical stress may be applied to load-sensitive resonators to form temperature sensors.

Equation 2 may be rewritten in terms of resonator stress $\sigma$ as:

$$S_\sigma = (\text{Constant}) \frac{L^2 \sigma}{t^2 E} \qquad \text{(Equation 3)}$$

Within the elastic limit, the resonator stress equals the modulus of elasticity E times the resonator strain $\epsilon$, and equation 3 may be written as:

$$S_\epsilon = (\text{Constant}) \frac{L^2 \epsilon}{t^2} \qquad \text{(Equation 4)}$$

The resonator strain $\epsilon$ may be directly applied through thermal expansion/contraction means, or the resonator may be stressed through intermediate spring/bellows arrangements.

Although a number of load-sensitive resonators may be mechanically stressed through thermal means to form temperature sensors, the following discussions will illustrate the inventive devices using flexing bar resonators, such as the single-beam force transducer with integral mounting isolation and the closed-end tuning fork force sensor.

Figure 3:
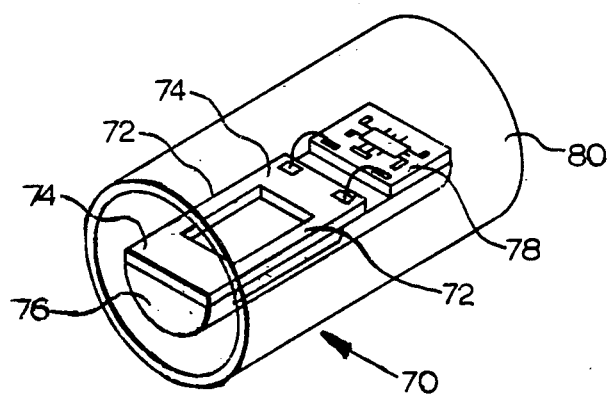
FIG. 3 is an isometric view illustrating a temperature sensor having a force-sensitive resonator mounted on a base so that thermally induced stress is transmitted from the base directly to the resonator.

FIG. 3 illustrates a digital temperature sensor 70 consisting of a closed-end tuning fork, force-sensitive resonator with tines 72 vibrating 180 degrees out of phase, attached through mounts 74 to a base 76 having a coefficient of thermal expansion $\alpha_B$, different from that of the resonator $\alpha_R$. The length of the resonator extending between mounts 74 changes due to temperature change $\Delta T$, causing resonator strain $\epsilon$.

$$\epsilon = (\alpha_B - \alpha_R)\Delta T \qquad \text{(Equation 5)}$$

If $S_T$ is defined as the fractional resonant frequency change per unit temperature change, then from Equations 4 and 5:

$$S_T = (\text{Constant}) \frac{L^2}{t^2} (\alpha_B - \alpha_R) \qquad \text{(Equation 6)}$$

Equation 6 shows that, with the proper choice of resonator dimensions L and t, and coefficients of thermal expansion $\alpha_B$ and $\alpha_R$, an extremely sensitive digital temperature sensor can be designed. Furthermore, if the resonator is fabricated from quartz crystal, then the objectives of high sensitivity, accuracy, and stability, as well as small size and weight, low power consumption, and rapid response time can be met. The resonator is connected to oscillator electronics 78 which may be integrally packaged as part of the temperature sensor 70, or the electronics may be remote from the resonator. The entire sensor 70 may be enclosed in a housing 80 such that the resonator operates in a vacuum or inert atmosphere for improved stability and accuracy.

As is well known in the art, crystal resonators, such as resonator 72, have sufficient compressional stiffness that they can be either tensioned or compressed. As a result, the resonator in sensor 70 may be unstressed at a first temperature in a preselected operating range. The resonator may then be compressed at temperatures differing from the first temperature by one polarity and tensioned at temperatures different from the first temperature in the opposite polarity. The resonant frequency of the resonator thus varies in opposite directions from the resonant frequency in the unstressed condition, depending upon the polarity of the temperature deviation from the first temperature.

Figure 4:
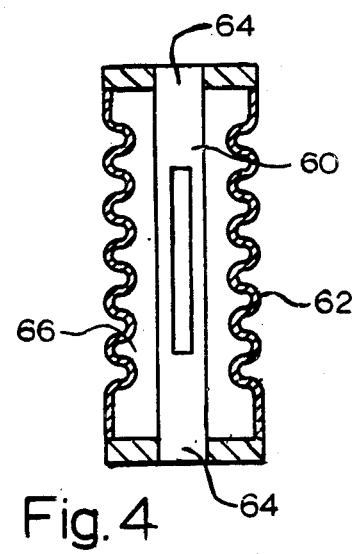
FIG. 4 is a plan view illustrating a temperature sensor having a force-sensitive resonator mounted in parallel with a bellows or spring so that thermally induced stress is transmitted from the bellows or spring directly to the resonator.

As illustrated in FIG. 4, a load-sensitive tuning fork 60 is encapsulated by a bellows or spring 62 which is attached to tuning fork mounts 64. The bellows or spring 62 has a coefficient of thermal expansion $\alpha_B$ which is different from the coefficient of thermal expansion of the resonator $\alpha_R$. If the temperature is changed, the thermal mismatch causes differential thermal growth over the length l between mounts 64 which reacts against the bellows spring rate $K_B$ to load the tuning fork 60 and change its resonant frequency. The thermally induced change in load with temperature is given by:

$$\frac{\partial F}{\partial T} = K_B l (\alpha_B - \alpha_R) \quad \text{(Equation 7)}$$

Using Equation 2, the fractional change in frequency per unit temperature change $S_T$ due to the mechanical stress is thus:

$$S_T = \text{(Constant)} \frac{L^2}{Ebt^3} K_B l (\alpha_B - \alpha_R)$$

A vacuum or inert atmosphere 66 may be contained within the bellows 62, or the entire sensor may be placed in a surrounding enclosure for improved accuracy and stability.

Figure 5:
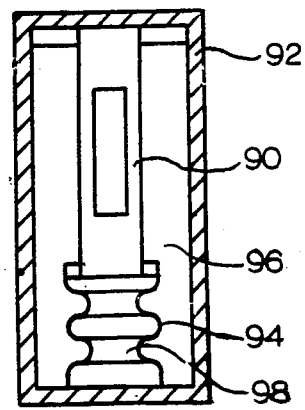
FIG. 5 is a plan view illustrating a temperature sensor having a force-sensitive resonator mounted in series with a bellows or spring so that thermally induced stress is transmitted from either the bellows or spring or a fluid in the bellows directly to the resonator.

FIG. 5 illustrates another embodiment of a digital temperature sensor using a bellows or spring and load-sensitive resonator. An enclosure 92 surrounds a closed-end tuning fork 90 and a bellows or spring 94 which are connected in series between the end walls of the enclosure 92. In this embodiment, the bellows or spring 94 do not encapsulate the tuning fork 90 as with the embodiment of FIG. 4. Temperature sensing occurs through reactive, thermally induced mechanical stress produced by the enclosure 92 and/or bellows or spring 94. The basic difference between the end connections of the embodiments of FIGS. 4 and 5 is that the bellows or spring 62 and tuning fork 60 of FIG. 4 are connected in parallel, while the bellows or spring 94 and tuning fork 90 of FIG. 5 are arranged in series.

The configuration illustrated in FIG. 5 may use thermal expansion or contraction of a fluid 98 (liquid or gas) contained within bellows 94 to stress resonator 90. The resonator 90 may operate in either a vacuum or an inert atmosphere 96 in sealed enclosure 92 such that improved resonator frequency stability is achieved.

I claim:

1. A temperature sensor comprising a load-sensitive resonator having at least a pair of spaced-apart mounts which are secured to a base and which isolates said resonator from external forces, said base having a coefficient of thermal expansion which is different from that of said resonator such that said base applies a thermally induced stress to said resonator, said resonator having a resonant frequency and being unstressed at a first temperature in a preselected operating range of said temperature sensor so that said resonator is compressed at temperatures differing from said first temperature so as to vary the resonant frequency by one polarity and tensioned at temperatures differing from said first temperature so as to vary the resonant frequency in the opposite polarity, thereby changing the resonant frequency of said resonator solely in accordance with changes in the temperature of said resonator and base.

2. A temperature sensor according to claim 1 wherein the resonator is fabricated from quartz crystal.

3. A temperature sensor according to claim 1 wherein the resonator is a closed-end tuning fork having a pair of tines extending between said mounts.

4. A method of measuring temperature change, comprising:
 exposing a temperature sensor to the temperature to be measured, said temperature sensor including a load-sensitive resonator having a pair of spaced-apart mounts secured to a temperature sensing member through a plurality of connections, said sensing member having a coefficient of thermal expansion which is different from that of said resonator such that the thermally induced stress applied to said resonator by said sensing member changes in accordance with said temperature change, said resonator having a resonator frequency and being unstressed at a first temperature in a preselected operating range of said temperature sensor so that said resonator is compressed at temperatures differing from said first temperature so as to vary the resonant frequency by one polarity and tensioned at temperatures differing from said first temperature so as to vary the resonant frequency in the opposite polarity, and
 measuring the change in resonant frequency of said resonator due solely to said thermally induced stress, thereby providing an indication of said temperature change.

5. The method of claim 4 wherein said temperature sensing member is a base on which said resonator is mounted.

6. The temperature sensor of claim 4 wherein said temperature sensing member is a resilient bellows.

7. The temperature sensor of claim 6 wherein the mounts of said resonator are connected directly to respective ends of said bellows such that said resonator and bellows are connected in parallel.

8. The temperature sensor of claim 7 wherein said bellows encapsulates said load-sensitive resonator and isolates said resonator from an external environment.

9. The temperature sensor of claim 6 wherein said bellows and resonator are connected in series with each other along a common axis with one mount of said resonator connected directly to one end of said bellows and the other mount of said resonator indirectly connected to the other end of said bellows through a force-transmitting structure.

10. The temperature sensor of claim 9 wherein said force-transmitting structure is an enclosure encapsulating said bellows and resonator to isolate said resonator from an external environment.

11. The temperature sensor of claim 10 wherein said bellows is filled with a fluid such that thermally induced volumetric expansions or contractions of said fluid, in combination with thermally induced expansions or contractions of said bellows and enclosure, stress said resonator to change the resonant frequency of said resonator.

12. The temperature sensor of claim 6 wherein said bellows is filled with a fluid such that thermally induced volumetric expansions or contractions of said fluid, in combination with thermally induced expansions or contractions of said bellows, stress said resonator to change the resonant frequency of said resonator.

13. The temperature sensor of claim 6 wherein said temperature sensing member is a spring.

14. The temperature sensor of claim 13 wherein the mounts of said resonator are connected directly to respective ends of said spring such that said resonator and spring are connected in parallel.

15. The temperature sensor of claim 13 wherein said spring and resonator are connected in series with each other along a common axis with one mount of said resonator connected directly to one end of said spring and the other mount of said resonator indirectly connected to the other end of said spring through a force-transmitting structure.

16. The temperature sensor of claim 15 wherein said force-transmitting structure is an enclosure encapsulating said spring and resonator to isolate said resonator from an external environment.

17. The method of claim 4 wherein said temperature sensing member is a resilient spring.

18. The method of claim 17 wherein said resonator and spring are connected to each other in parallel with the mounts of said resonator connected to respective ends of said spring.

19. The method of claim 4 wherein said temperature sensing member is a resilient bellows.

20. The method of claim 19 wherein said resonator and bellows are connected to each other in parallel with the mounts of said resonator connected to respective ends of said bellows and said bellows encapsulating said resonator to isolate said resonator from an external environment.

21. The method of claim 19 wherein said bellows and resonator are connected in series with each other along a common axis with one mount of said resonator connected to one end of said bellows, the other mount of said resonator connected to an internal surface of an enclosure and the other end of said bellows connected to an opposite internal surface of said enclosure, said enclosure encapsulating said bellows and resonator to isolate said resonator from an external environment wherein said resonator is stressed solely by expansions and contractions of said bellows and enclosure.

22. The method of claim 21 wherein said bellows is filled with a fluid such that thermally induced volumetric expansions or contractions of said fluid, in combination with thermally induced expansions or contractions of said bellows and enclosure, stress said resonator to change the resonant frequency of said resonator.

23. The method of claim 19 wherein said spring and resonator are connected in series with each other along a common axis with one mount of said resonator connected to one end of said spring, the other mount of said resonator connected to an internal surface of an enclosure and the other end of said spring connected to an opposite internal surface of said enclosure, said enclosure encapsulating said spring and resonator to isolate said resonator from an external environment wherein said resonator is stressed solely by expansions and contractions of said spring and enclosure.

* * * * *